United States Patent [19]

Quataert

[11] Patent Number: 5,367,863
[45] Date of Patent: Nov. 29, 1994

[54] MOWING MACHINE

[75] Inventor: Maria P. Quataert, Nuenen, Netherlands

[73] Assignee: P. J. Zweegers en Zonen Landbouwmachinefabriek B.V., Geldrop, Netherlands

[21] Appl. No.: 905,058

[22] Filed: Jun. 26, 1992

[30] Foreign Application Priority Data

Jun. 26, 1991 [NL] Netherlands .................. 9101107
Jan. 29, 1992 [NL] Netherlands .................. 9200156

[51] Int. Cl.⁵ ................................ A01D 34/66
[52] U.S. Cl. ................................ 56/13.5; 56/11.3
[58] Field of Search ........... 56/13.5, 13.6, 138, 56/11.3, 11.6, 6; 474/237, 238, 265

[56] References Cited

U.S. PATENT DOCUMENTS

| | | | |
|---|---|---|---|
| 2,658,402 | 11/1953 | Place | 474/237 X |
| 3,523,462 | 8/1970 | Beindorf | 474/237 X |
| 4,307,558 | 12/1981 | Bent et al. | 56/11.6 X |
| 4,400,930 | 8/1983 | Hohman et al. | 56/11.6 |
| 4,709,540 | 12/1987 | Collart | 56/13.6 |
| 4,813,215 | 3/1989 | Chase et al. | 56/11.3 X |
| 4,887,416 | 12/1989 | Crane et al. | 56/13.6 |
| 4,890,445 | 1/1990 | Crane | 56/13.6 |
| 4,947,629 | 8/1990 | Ermacora et al. | 56/13.6 |
| 5,079,906 | 1/1992 | Quataert | 56/13.6 X |
| 5,177,942 | 1/1993 | Hager et al. | 56/13.6 X |

FOREIGN PATENT DOCUMENTS

| | | |
|---|---|---|
| 0206965 | 5/1990 | European Pat. Off. . |
| 0404213A1 | 12/1990 | European Pat. Off. . |
| 1549969 | 12/1968 | France . |
| 2521389 | 8/1983 | France . |
| 1134514 | 11/1968 | United Kingdom . |
| 2056836A | 3/1981 | United Kingdom . |
| 2118813 | 11/1983 | United Kingdom . |

Primary Examiner—Mark Rosenbaum
Assistant Examiner—Frances Han
Attorney, Agent, or Firm—Skjerven, Morrill, MacPherson, Franklin & Friel

[57] ABSTRACT

The invention relates to a mowing machine provided with a frame and with a plurality of mowing means arranged side by side in a row, which are supported by the frame, which mowing means are rotatable about upwardly extending axes of rotation during operation and which are each connected to a pulley. A driving belt is passed over said pulleys connected to the mowing means, said driving belt also being passed over a pulley arranged near one end of the row of mowing means, which pulley can be driven from a driving source driving the mowing machine during operation. The contact between the driving belt and the pulleys connected to the mowing means is arranged in such a manner, that with the same tensile force in the part of the driving belt that is in contact with the pulley in question the driving belt can transmit more power to a pulley connected to a mowing means which is located near the drivable pulley than to a pulley connected to a mowing means which is located further away from the drivable pulley.

42 Claims, 3 Drawing Sheets

MOWING MACHINE

BACKGROUND OF THE INVENTION

The invention relates to a mowing machine provided with a frame and with a plurality of mowing means arranged side by side in a row, which are supported by the frame, which mowing means are rotatable about upwardly extending axes of rotation during operation and which are each connected to a pulley, whilst a driving belt is passed over said pulleys connected to the mowing means, said driving belt also being passed over a pulley arranged near one end of the row of mowing means, which pulley can be driven from a driving source driving the mowing machine during operation.

Such mowing machines are generally known, e.g. from European Patent Applications Nos. 0 206 965 and 0 404 213. The drivable pulley is thereby generally driven from the power take-off shaft of a tractor moving the mowing machine during operation. The driving belt is furthermore passed along the similarly constructed pulleys connected to the mowing means, in such a manner that the belt surrounds each of the various pulleys connected to the mowing means through at least substantially the same circumferential angle.

It is noted that from GB-A-2056836 a device is known wherein three mowing means are driven from a drivable pulley by means of a V-belt. The mowing means located nearest the drivable pulley is connected to a pulley which has a flat cylindrical outer circumference and which co-operates with the flat rear side of the V-belt. The pulleys connected to the other mowing means have the usual V-shaped groove for co-operation with the V-belt in the usual manner. In order to try to prevent the occurrence of slip between the flat rear side of the V-belt and the pulley co-operating with said flat rear side said pulley is surrounded by the V-belt through a large circumferential angle, whilst at the same time large tensions are set up in the V-belt near said pulley. This may lead to undesirably high tensions in the V-belt.

FR-A-1.549.969 relates to a mowing device wherein use is made of a toothed belt for driving said device, the toothed surface of said belt co-operates with toothed pulleys, which are connected to part of the mowing means, whilst the opposite smooth surface of the belt co-operates with flat pulleys, which are connected to further mowing means. FR-A-1.549.969 thereby mentions that, with regard to the angle through which the belt extends over a pulley, account is taken for the fact whether the belt co-operates with a smooth or with a toothed pulley. However, said publication does not provide any indication with regard to the problem underlying the present invention and/or with regard to the solution of said problem.

Furthermore, with mowing machines equipped with a belt transmission the pulleys are generally fixedly connected to the driving shafts of the mowing means. During operation of such mowing machines it may occur that a mowing means is blocked, e.g. by some obstacle or other, so that both the mowing means and the pulley secured thereto via the driving shaft will come to a stop. As a result of this the driving belt will start to slip with respect to the pulley. If said blocking of a mowing means is not immediately noticed by the operator of the mowing machine, it may happen that the driving belt will slip with respect to the blocked pulley for some time, as a result of which the temperature of the pulley may strongly increase. When after some time the operator notices that a mowing means is blocked and the operator stops the drive of the mowing machine, the belt will come to a stop and a part of the belt, which is stationary at that moment, will be in contact with a strongly heated part of the blocked pulley. This may seriously affect the material of the driving belt and cause a local weakening of the driving belt, which may eventually result in the driving belt breaking prematurely.

SUMMARY OF THE INVENTION

It has become apparent to the Applicant that breaking of the driving belt may occur after a comparatively short time of service of the machine, so that such breaking of the driving belt cannot be ascribed to normal wear. Applicant has come to the conclusion that this phenomenon can presumably be ascribed to the fact that the build-up of forces in the belt passed over the pulleys of the mowing means leads to a situation where considerably more power is transmitted to a pulley connected to a mowing means located farther away from the drivable pulley (with respect to the configuration of pulleys shown in FIG. 1) than is transmitted to a mowing means located nearer the drivable pulley. Since the power to be transmitted to the mowing means located closest to the drivable pulley must be sufficient to drive said mowing means during normal operation, it will be apparent that in the above-described situation the power which can be transmitted to the mowing means located farthest away from the drivable pulley may considerably exceed the power required for normal operation, so that in case of a possible overloading of a mowing means located at some distance from the drivable pulley, overloading of the driving belt which drives said mowing means may occur at that location, which may result in the breaking of the belt.

According to the invention, this drawback of the known mowing machines may be avoided in a simple manner, in that the contact between the driving belt and the pulleys connected to the mowing means is arranged in such a manner that with the same tensile force in the part of the driving belt that is in contact with the pulley in question, the driving belt can transmit more power to a pulley connected to a mowing means which is located near the drivable pulley than to a pulley connected to a mowing means which is located farther away from the drivable pulley.

By suitably arranging the contact between the pulleys connected to the mowing means and the driving belt in this manner, it can be effected that no overly large deviations occur in the powers to be transmitted to the various pulleys, so that undesirably large overloading of the driving belt can be avoided.

According to a further aspect of the invention the objective is to obtain a mowing machine of the above kind, wherein said drawback of known mowing machines equipped with driving belts for driving the mowing means can be avoided.

According to the invention this may be achieved in that a slip clutch is provided between the pulley and the driving shaft secured to the respective mowing means, said slip clutch being provided with at least one friction means coupled to the driving shaft, said friction means being rotated along by the driving shaft and co-operating with a friction surface connected with the pulley, against which said friction means is pressed with a certain amount of precompression.

Because the friction means rotating along with the driving shaft already abuts against the friction surface connected with the pulley with a certain amount of precompression, also in the situation where the driving shaft is stationary, the driving shaft of the mowing means will normally be driven by the pulley, together with the mowing means, when the driving of said mowing means via the respective pulley is started. With an increasing number of revolutions the frictions means rotating along with the driving shaft will be pressed against the friction surface connected with the pulley with increasing force, under the influence of the centrifugal force, so that during normal operation the power required for driving the respective mowing means can be transmitted from the respective pulley to the respective driving shaft without any problem.

When for some reason or other the mowing means connected to the driving shaft is blocked, the driving shaft also will come to a stop, so that the centrifugal force exerted on the friction means during normal operation drops out and the friction means is pressed against the friction surface connected with the pulley with only a comparatively small amount of precompression. Consequently the pulley, which is still being driven, can easily be rotated with respect to the stationary driving shaft without any undue heat being generated in the pulley, so that undesirable heating of the belt is avoided as well.

BRIEF DESCRIPTION OF THE DRAWINGS

The invention will be further explained hereafter with reference to the accompanying Figures.

DETAILED DESCRIPTION

Figure 1:
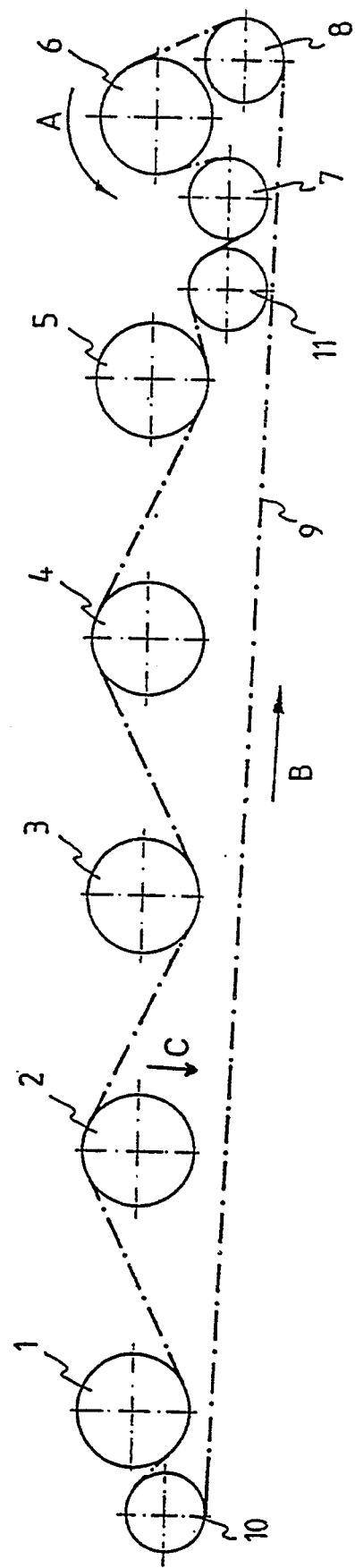
FIG. 1 diagrammatically illustrates a possible arrangement of pulleys with a mowing machine of the type such as e.g. disclosed in the above-mentioned European patent applications.

As is illustrated in FIG. 1, a mowing machine of the above type is provided with a plurality of pulleys 1-5, which are each journalled in a frame (not shown) about an upwardly extending axis of rotation in a manner known per se and which are connected to mowing means (not shown either). Furthermore a drivable pulley 6 is journalled in the frame near one end of the row of pulleys 1-5, which pulley 6 may be driven in a usual manner, via a transmission mechanism, from the power take-off shaft of a tractor or the like moving the mowing machine during operation. Two further pulleys 7 and 8 are disposed near the drivable pulley 6, so as to guide a driving belt 9 passed over the various pulleys in such a manner that said driving belt 9 surrounds the drivable pulley 6 through a sufficiently large angle to transmit the power supplied by the drivable pulley 6 to the belt 9 in a suitable manner.

A further guide pulley 10 is provided near the end of the row of pulleys 1-5 connected to the mowing means remote from the drivable pulley, so as to effect that the belt 9 is also suitably passed over the pulley 1 located furthest away from the drivable pulley 6 and guided back again in the direction of the guide pulley 7 located near the drivable pulley 6.

Furthermore a tensioning wheel 11, which is known per se, is provided between the guide pulley 7 and the pulley 5 connected to a mowing means located nearest the drivable pulley 6.

During operation of the mowing machine the drivable pulley is driven in the direction according to the arrow A, so that the belt 9 is pulled in the direction according to the arrow B.

As furthermore appears from FIG. 1, the arrangement of the various pulleys connected to the mowing means 1-5 and the further pulleys guiding the belt is such that the belt 9 surrounds each of said pulleys 1-5 through at least substantially the same angle.

Figure 2:
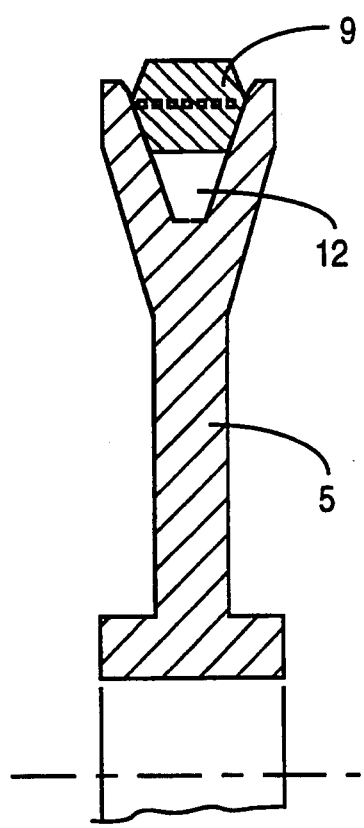
FIG. 2 diagrammatically shows an embodiment of a pulley connected to a mowing means and the driving belt co-operating therewith.

Usually the pulleys are thereby provided with a V-shaped groove 12, as is illustrated in FIG. 2 for the pulley 5, in which the driving belt 9 is accommodated in such a manner that the belt abuts against the side walls of said groove 12.

With the conventional mowing machines this co-operation between pulley and belt is the same for each of the pulleys 1-5, i.e. the circumferential angle at which the driving belt 9 abuts against the side walls of the circular groove 12 is at least substantially the same for each of the pulleys 1-5.

As set forth above the result of this arrangement of pulleys and driving belt and the manner in which the driving belt is driven will be that the further a pulley connected to a mowing means is located from the drivable pulley, the more power can be transmitted via the driving belt to the respective pulley connected to a mowing means, as a result of the increase of the tensile force in the driving belt 9, in a direction remote from the drivable pulley 6, along the pulleys 1-5 to be driven. Of course the power that can be transmitted to the pulley 5 located nearest the drivable pulley 6 must be large enough to drive the mowing means connected to said pulley during operation. This implies that the power that can be transmitted to e.g. the pulleys 1 and 2 by means of the driving belt 9 will be considerably larger than the power required for driving the mowing means connected to the pulleys 1 and 2 during normal operation. When such mowing means connected to the pulleys 1 and 2 strike obstacles, strong overloading and breaking of the driving belt may therefore occur, because the driving belt will not slip with respect to the respective pulleys 1 and 2, as will be the case when e.g. such overloading occurs at the location of the mowing means connected to the pulley 5.

According to the invention this disadvantageous phenomenon can be simply avoided by controlling the power to be transmitted to the various pulleys 1-5 by means of the driving belt 9. As is illustrated in FIG. 3, this may e.g. be effected by means of an arrangement wherein, in the case of pulleys located further away from the drivable pulley 6, e.g. the pulleys 1 and 2, the belt 9 does not co-operate with the side walls of the circular grooves 12 of the pulley, but only abuts against the bottom of the circular groove 13, which is wider in that case, as is illustrated for the pulley 1 in FIG. 3.

Figure 3:
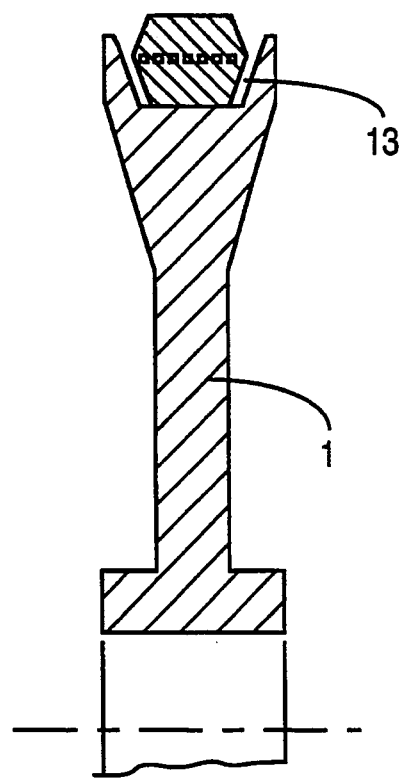
FIG. 3 is a diagrammatic sectional view of a further embodiment of a pulley connected to a mowing means and the driving belt co-operating therewith.

For those skilled in the art it will be apparent that when the belt 9 surrounds the pulley 5 shown in FIG. 2 through the same angle as the belt 9 surrounds the pulley 1 shown in FIG. 3, the embodiment according to FIG. 3 will sooner exhibit slip than the embodiment according to FIG. 2 when a certain tensile force in the belt is reached. It will therefore be apparent that with the construction of e.g. the pulleys 1 and 2 shown in FIG. 3, slip of said pulleys with respect to the belt 9 in case of overloading of the mowing means connected with said pulleys 1 and 2 will occur much sooner than with the constructions of mowing machines which has been usual so far, wherein all pulleys connected to the mowing means have the same construction, e.g. as shown in FIG. 2.

Another possibility of achieving the effect the invention aims at is to effect that the angle through which the pulleys connected with the mowing means located further away from the drivable pulley 6, for example the pulleys 1 and 2, are surrounded by the driving belt 9 is smaller than the angle through which the pulleys connected to the mowing means located nearer the drivable pulley 6, such as e.g. the pulleys 3–5, are surrounded by the driving belt 9. This may e.g. be effected by disposing the pulley 2 in the frame in such a manner that said pulley is slightly shifted, in the direction according to the arrow C, with respect to the pulleys 1 and 3.

Figure 4:
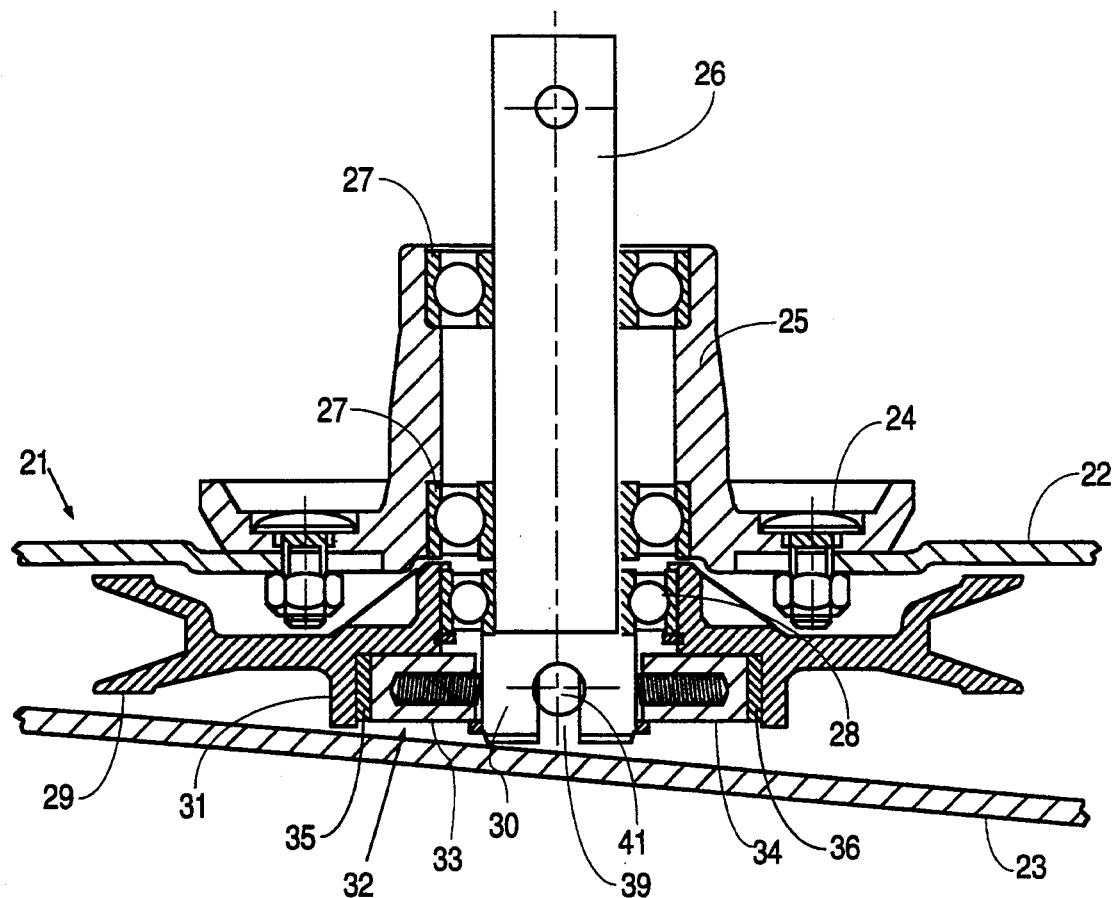
FIG. 4 is a more detailed, partly sectional and partly elevational view of a part of the mowing machine according to the invention.

As is common and as shown in FIG. 4, the mowing machine is provided with an elongated hollow beam 21 having an upper wall 22 and a bottom wall 23, said beam functioning to support a plurality of mowing means (not shown) arranged side by side, which are rotatable about upwardly extending axes of rotation, which mowing means may e.g. be built up of discs with cutting blades secured thereto.

FIG. 4 shows only part of such a beam 21, as well as a hub 25 secured thereto by means of bolts 24, which functions to support a driving shaft 26, which is rotatably supported in the hub 25 by means of roller bearings 27.

A mowing means (not shown) may be secured, in a manner known per se, to the end projecting beyond the upper side of the hub 25.

By means of a bearing 28 a pulley 29 is provided on the end of the driving shaft projecting from the bottom side of the hub 25 into the hollow beam 21, in such a manner that the pulley is rotatable about the central axis of the driving shaft 26. As is apparent from FIG. 4, the bearing 28 is confined between an enlarged bottom end 30 of the driving shaft 26 and a bearing 27 accommodated in the hub 25.

A slip clutch 32 is provided between the enlarged bottom end 30 of the driving shaft 26 and the inner wall of an annular collar 31 of the pulley 29. Said slip clutch 32 comprises two friction means 33 and 34 in the shape of semicircular segments, which each extend about the enlarged part 30 of the driving shaft 26 through an angle of substantially 180°. The outer circumference of each of said friction means 33 and 34 is covered with a lining 35 and 36 respectively of a material having a high coefficient of friction. Said linings are intended to make contact with the inside surface of the annular collar 31 of the pulley 29.

Figure 5:
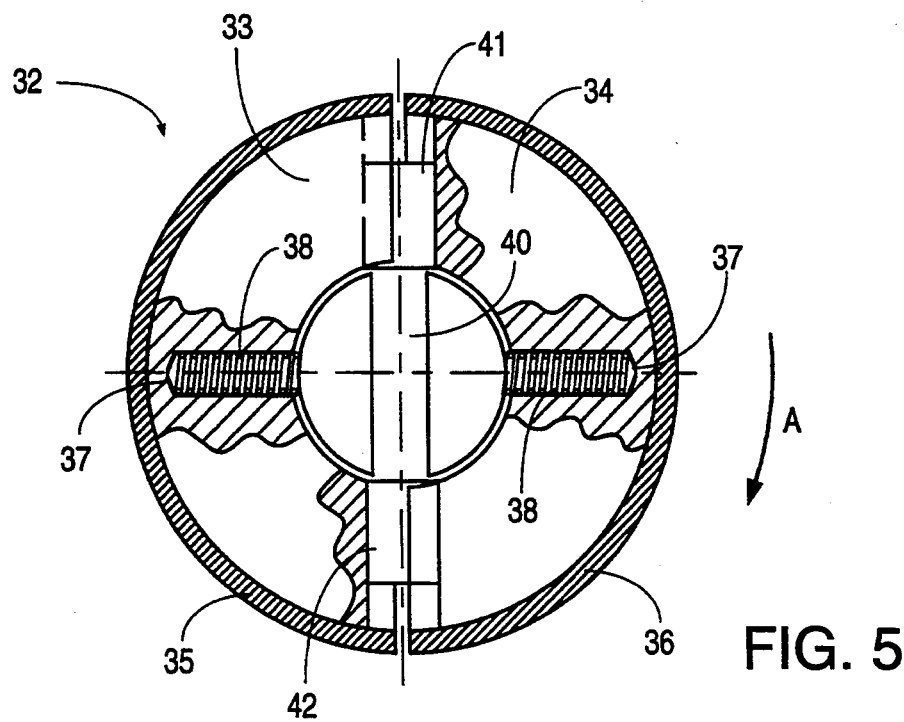
FIG. 5 is a larger-scale view of one end of the driving shaft with the friction means connected therewith.

As is furthermore apparent from FIGS. 4 and 5, the two friction means 33 and 34 in the shape of semicircular segments are provided with radial blind bores 37 near their centers, said bores extending into the respective friction means 35 and 36 from their boundary planes facing the enlarged part 30 of the driving shaft 26. Compression springs 38 are provided in said bores, said compression springs being confined between the outer circumference of the enlarged part 30 of the driving shaft 26 and the bottoms of the respective blind bores 37. The construction is thereby such that in the stationary position of the driving shaft 26 the friction linings 35 and 36 abut with a small amount of precompression against the inner circumference of the annular collar 31, which forms a friction surface connected with the pulley.

As will furthermore be apparent from FIGS. 4 and 5, a diametrically extending slotted hole 39 is provided in the enlarged end 30 of the driving shaft 26, a pin 40 being located in said slotted hole, the diameter of the ends 41 and 42 of said pin projecting beyond the slotted hole 39 being larger than the diameter of the parts of the pin 40 located inside the slotted hole, said latter diameter corresponding with the width of the slotted hole 39.

Recesses are provided in the opposed ends of the friction means, said recesses functioning to receive the enlarged ends 41 and 42 respectively of the pin 40 (FIG. 5).

When during operation the mowing means are driven the pulley 29 will be rotated in the direction according to the arrow A (FIG. 5) by means of a belt (not shown).

Because, as already mentioned above, the friction means 33 and 34, in particular the friction linings 35 and 36 provided on the outer circumference of said friction means, abut against the inner side of the circular collar 31 under the influence of the slightly compressed springs 38, the driving shaft 26 will likewise be rotated in the direction according to the arrow A. With an increasing number of revolutions the friction means 33 and 34 will tend to move towards the outside under the influence of the centrifugal force. In particular the left-hand friction means 33, when seen in FIG. 5, will tilt, as it were, about the left-hand upper end of the enlarged part 41 of the pin 40, whilst the right-hand friction means 34, when seen in FIG. 5, will thereby tilt, as it were, about the right-hand bottom end of the enlarged part 42 of the pin 40. The enlarged ends 41 and 42 may be referred to as stop means, since they act as stops against which the friction means 33 and 34 are supported.

Because of this tendency of the friction means 33 and 34 to move towards the outside under the influence of the centrifugal force said friction means will be pressed firmly against the friction surface formed by the inner circumference of the collar 31, which is connected with the pulley, so that the power required for the drive of the mowing means connected to the driving shaft during normal operation can be transmitted. The slip clutch is thereby preferably constructed in such a manner that said slip clutch will slip when the power to be transmitted by the slip clutch exceeds a certain limit, which limit is set such that the maximum power to be transmitted by the belt is not reached.

When the mowing means secured to the driving shaft 26 is blocked also the shaft 26 will come to a stop. It will be apparent that in that case the centrifugal forces acting on the friction means 33 and 34 will drop out, so that only the springs 38 still press the friction means 33 and 34 against the friction surface formed by the inner circumference of the annular collar 31 with a comparatively small amount of precompression. Consequently the pulley 29 can be driven while only a comparatively small force is being exerted by means of the driving belt, whilst the amount of heat generated in the slip clutch as a result of the friction will thereby be small.

Also when a possible blocking of a mowing machine is not immediately noticed by the operator of the mowing means there will be no undesirable overheating of the pulley 29 with the consequent damage to the driving belt.

The above-described slip clutch is suited for rotation in the direction according to the arrow A as well as for rotation in a direction opposite to the direction of the arrow A. Indeed, in the latter case the left-hand friction means 33, when seen in FIG. 5, will tend to tilt about the left-hand bottom end, when seen in FIG. 5, of the enlarged part 42 of the pin 40 under the influence of the centrifugal force occurring during operation. In a similar manner the right-hand friction means 34, when seen in FIG. 5, will tend to tilt about the right-hand top end of the enlarged part 41 of the pin 40 under the influence of the centrifugal force. When the slip clutch rotates in a direction opposite to the arrow A, the eventual action of the slip clutch is therefore essentially the same as the action of the slip clutch in case of rotation in the direction according to the arrow A. The occurrence of any mounting errors is thus avoided.

I claim:

1. A mowing machine, comprising:
    a frame;
    a plurality of mowing means arranged side by side in a row and supported by the frame, each of which mowing means is rotatable about an upwardly extending axis of rotation;
    a plurality of pulleys, each of which is connected to one of the mowing means;
    a drivable pulley arranged near one end of the row of mowing means, which drivable pulley can be driven from a driving source driving the mowing machine; and
    a driving belt passed over the drivable pulley and over each of the pulleys connected to the mowing means so that the drivable pulley drives each of the other pulleys;
    said mowing machine being characterized in that the contact between the driving belt and the pulleys connected to the mowing means and being driven by the drivable pulley is arranged in such a manner that, with regard to the tensile force in the part of the driving belt that is in contact with each of the pulleys being driven, the amount of power that is transmitted to a pulley in proportion to a given amount of tensile force is greater for a pulley located nearer to the drivable pulley measured from the drivable pulley to the nearer pulley in the direction of belt movement than for a pulley located farther away from the drivable pulley measured from the drivable pulley to the farther pulley in the direction of belt movement.

2. A mowing machine according to claim 1, wherein the pulleys are provided with V-shaped circumferential grooves for accommodating the driving belt, characterized in that said driving belt co-operates with the side walls of said V-shaped groove of a pulley of a mowing means located near the drivable pulley and co-operates with the bottom of the groove of a pulley of a mowing means located further away from the drivable pulley.

3. A mowing machine according to claim 2, characterized in that the driving belt surrounds the pulley of a mowing means located near the drivable pulley through a larger circumferential angle than is the case with the pulley of a mowing means located at a larger distance from the drivable pulley.

4. A mowing machine, in particular according to claim 3, wherein a driving shaft journalled in the frame and secured to a mowing means can be driven via the pulley connected with the driving shaft and the driving belt which acts on the pulley, characterized in that a slip clutch is provided between the pulley and the driving shaft secured to the mowing means, said slip clutch being provided with at least one friction means coupled to the driving shaft, said friction means being rotated along by the driving shaft and co-operating with a friction surface connected with the pulley, against which said friction means is pressed with a certain amount of precompression.

5. A mowing machine according to claim 4 characterized in that two friction means are provided, each of said friction means extending about the driving shaft through an arc of ±180°.

6. A mowing machine according to claim 4, characterized in that a friction means extends about the driving shaft through an arc of ±180°, said friction means near its two ends being supported by a stop means rotating along with the driving shaft.

7. A mowing machine according to claim 6 characterized in that two friction means are provided, each of said friction means extending about the driving shaft through an arc of ±180°.

8. A mowing machine according to claim 6, characterized in that said stop means are formed by the ends projecting beyond the shaft of a pin passed through the driving shaft.

9. A mowing machine according to claim 8 characterized in that two friction means are provided, each of said friction means extending about the driving shaft through an arc of ±180°.

10. A mowing machine according to claim 8, characterized in that said ends of the pin projecting beyond the shaft are thicker than the part of the pin accommodated in a slotted hole formed in the driving shaft.

11. A mowing machine according to claim 10 characterized in that two friction means are provided, each of said friction means extending about the driving shaft through an arc of ±180°.

12. A mowing machine according to claim 11, characterized in that a stop means is at least partially accommodated in a recess provided in one end of a friction means.

13. A mowing machine, in particular according to claim 2, wherein a driving shaft journalled in the frame and secured to a mowing means can be driven via the pulley connected with the driving shaft and the driving belt which acts on the pulley, characterized in that a slip clutch is provided between the pulley and the driving shaft secured to the mowing means, said slip clutch being provided with at least one friction means coupled to the driving shaft, said friction means being rotated along by the driving shaft and co-operating with a friction surface connected with the pulley, against which said friction means is pressed with a certain amount of precompression.

14. A mowing machine according to claim 13 characterized in that two friction means are provided, each of said friction means extending about the driving shaft through an arc of ±180°.

15. A mowing machine according to claim 13, characterized in that a friction means extends about the driving shaft through an arc of ±180°, said friction means near its two ends being supported by a stop means rotating along with the driving shaft.

16. A mowing machine according to claim 15 characterized in that two friction means are provided, each of said friction means extending about the driving shaft through an arc-of ±180°.

17. A mowing machine according to claim 15, characterized in that said stop means are formed by the ends projecting beyond the shaft of a pin passed through the driving shaft.

18. A mowing machine according to claim 17 characterized in that two friction means are provided, each of said friction means extending about the driving shaft through an arc of ±180°.

19. A mowing machine according to claim 17, characterized in that said ends of the pin projecting beyond the shaft are thicker than the part of the pin accommodated in a slotted hole formed in the driving shaft.

20. A mowing machine according to claim 19 characterized in that two friction means are provided, each of said friction means extending about the driving shaft through an arc of ±180°.

21. A mowing machine according to claim 20, characterized in that a stop means is at least partially accommodated in a recess provided in one end of a friction means.

22. A mowing machine according to claim 1, characterized in that the driving belt surrounds the pulley of a mowing means located near the drivable pulley through a larger circumferential angle than is the case with the pulley of a mowing means located at a larger distance from the drivable pulley.

23. A mowing machine, in particular according to claim 22, wherein a driving shaft journalled in the frame and secured to a mowing means can be driven via the pulley connected with the driving shaft and the driving belt which acts on the pulley, characterized in that a slip clutch is provided between the pulley and the driving shaft secured to the mowing means, said slip clutch being provided with at least one friction means coupled to the driving shaft, said friction means being rotated along by the driving shaft and co-operating with a friction surface connected with the pulley, against which said friction means is pressed with a certain amount of precompression.

24. A mowing machine according to claim 23 characterized in that two friction means are provided, each of said friction means extending about the driving shaft through an arc of ±180°.

25. A mowing machine according to claim 23, characterized in that a friction means extends about the driving shaft through an arc of ±180°, said friction means near its two ends being supported by a stop means rotating along with the driving shaft.

26. A mowing machine according to claim 25 characterized in that two friction means are provided, each of said friction means extending about the driving shaft through an arc of ±180°.

27. A mowing machine according to claim 25, characterized in that said stop means are formed by the ends projecting beyond the shaft of a pin passed through the driving shaft.

28. A mowing machine according to claim 27 characterized in that two friction means are provided, each of said friction means extending about the driving shaft through an arc of ±180°.

29. A mowing machine according to claim 27, characterized in that said ends of the pin projecting beyond the shaft are thicker than the part of the pin accommodated in a slotted hole formed in the driving shaft.

30. A mowing machine according to claim 29 characterized in that two friction means are provided, each of said friction means extending about the driving shaft through an arc of ±180°.

31. A mowing machine according to claim 30, characterized in that a stop means is at least partially accommodated in a recess provided in one end of a friction means.

32. A mowing machine, in particular according to claim 1, wherein a driving shaft journalled in the frame and secured to a mowing means can be driven via the pulley connected with the driving shaft and the driving belt which acts on the pulley, characterized in that a slip clutch is provided between the pulley and the driving shaft secured to the mowing means, said slip clutch being provided with at least one friction means coupled to the driving shaft, said friction means being rotated along by the driving shaft and cooperating with a friction surface connected with the pulley, against which said friction means is pressed with a certain amount of precompression.

33. A mowing machine according to claim 32, characterized in that two friction means are provided, each of said friction means extending about the driving shaft through an arc of ±180°.

34. A mowing machine according to claim 32, characterized in that a friction means extends about the driving shaft through an arc of ±180°, said friction means near its two ends being supported by a stop means rotating along with the driving shaft.

35. A mowing machine according to claim 34, characterized in that two friction means are provided, each of said friction means extending about the driving shaft through an arc of ±180°.

36. A mowing machine according to claim 34, characterized in that said stop means are formed by the ends projecting beyond the shaft of a pin passed through the driving shaft.

37. A mowing machine according to claim 36, characterized in that two friction means are provided, each of said friction means extending about the driving shaft through an arc of ±180°.

38. A mowing machine according to claim 36, characterized in that said ends of the pin projecting beyond the shaft are thicker than the part of the pin accommodated in a slotted hole formed in the driving shaft.

39. A mowing machine according to claim 38, characterized in that two friction means are provided, each of said friction means extending about the driving shaft through an arc of ±180°.

40. A mowing machine according to claim 39, characterized in that a stop means is at least partially accommodated in a recess provided in one end of a friction means.

41. A mowing machine according to claim 32, 34, 36, 38, 40, 13, 23, 4, 15, 25, 6, 17, 27, 8, 19, 29, 10, 33, 35, 37, 39, 14, 24, 5, 16, 26, 7, 18, 28, 9, 20, 30, 11, 21, 31 or 12, characterized in that one friction means is provided with a recess, which accommodates a compression spring supported on the driving shaft.

42. A mowing machine according to claim 41, characterized in that said compression spring is accommodated near the center of the friction means in a bore provided in said friction means, said bore extending radially with respect to the central axis of the driving shaft.

* * * * *